United States Patent

Aughton et al.

[11] Patent Number: 4,628,350
[45] Date of Patent: Dec. 9, 1986

[54] IMAGE ENHANCEMENT

[75] Inventors: John E. Aughton, London; Robert J. Oldershaw, Norfolk, both of England

[73] Assignee: Crosfield Electronics (USA) Limited, London, England

[21] Appl. No.: 766,320

[22] Filed: Aug. 16, 1985

[30] Foreign Application Priority Data

Aug. 24, 1984 [GB] United Kingdom ............... 8421512

[51] Int. Cl.$^4$ ............................................. H04N 1/46
[52] U.S. Cl. ...................................... 358/75; 358/42; 358/80
[58] Field of Search ..................... 358/42, 75, 78, 80

[56] References Cited

U.S. PATENT DOCUMENTS

| | | | |
|---|---|---|---|
| 2,606,245 | 8/1952 | Hall | 358/80 |
| 2,911,468 | 11/1959 | Pourciau | 358/209 |
| 3,012,093 | 12/1961 | Taudt | 358/80 |
| 3,612,753 | 10/1971 | Korman | 358/80 |
| 3,878,559 | 4/1975 | Pugsley | 358/75 |
| 4,199,219 | 4/1980 | Suzki | 358/75 |

FOREIGN PATENT DOCUMENTS

| | | |
|---|---|---|
| 2129230 | 10/1972 | France . |
| 2520175 | 1/1983 | France . |
| 56-153314 | 11/1981 | Japan . |
| 712499 | 7/1954 | United Kingdom . |

Primary Examiner—Ronald C. Capossela
Attorney, Agent, or Firm—Sughrue, Mion, Zinn, Macpeak and Seas

[57] ABSTRACT

Scanning apparatus for generating signals representing color components of successively scanned picture elements of an original colored image comprises a light source (1); means (42,45) for causing relative movement between the original image (3) and a light beam generated by the light source (1) whereby successive picture elements of the original image are scanned. Means (13) for generating a sharp light beam for each color component of each element and an unsharp light beam for at least one color component of each element are provided. Common detection means (10) receives the sharp and unsharp light beams and provides corresponding output signals. Sequencing means such as a filter wheel (13) causes the sharp and unsharp beams sequentially to impinge on the detection means (10).

9 Claims, 4 Drawing Figures

IMAGE ENHANCEMENT

The invention relates to apparatus for carrying out unsharp masking.

In conventional electronic scanning apparatus an original image is scanned element by element by means of an electro-optical system to derive one or more signals representing the densities or transmittances of the successively scanned elements. If a monochrome image is scanned then a single picture signal will be generated whereas if a coloured image is scanned then a number of picture signals will be generated corresponding to each colour component, for example cyan, magenta, and yellow. These electronic signals, after modification are used to control the exposure of an output medium to one or more exposing light beams.

One enhancement which is often carried out on the picture signals is know as "unsharp masking". The purpose of unsharp masking is to increase the sharpness of boundaries in the image and it may additionally introduce a narrow fringe. An example of image generating apparatus in which unsharp masking is carried is illustrared in No. GB-A-712,4999. In this apparatus, an image is exposed to a light beam which passes through a lens and is divided into two subsidiary light beams which are passed through narrow and wide apertures respectively to detectors. The beam passing through the narrow aperture is used to generate the sharp signal for each element of the image while the beam passing through the wide aperture is used to generate the unsharp signal. These signals are then combined in a predetermined manner to enhance the final image. This use of different sized apertures requires accurate positioning of the apertures and leads to a complicated construction.

More recently, the unsharp signal has been generated electronically from one or more of the sharp signals. In one example, the sharp signals are fed to respective two dimensional digital interpolators. This system requires complex electronic equipment for its implementation which is expensive and since it is digital leads to some loss of accuracy.

In accordance with the present invention, scanning apparatus for generating signals representing colour components of successively scanned picture elements of an original coloured image comprises a light source; means for causing relative movement between the original image and a light beam generated by the light source whereby successive picture elements of the original image are scanned; means for generating a sharp light beam for each colour component of each element; means for generating an unsharp light beam for at least one colour component of each element; common detection means for receiving the sharp and unsharp light beams and for providing corresponding output signals; and sequencing means for causing the sharp and unsharp beams sequentially to impinge on the detecting means.

This invention simplifies the prior arrangements in particular by providing a single common detection means rather than separate detectors for each colour or colour component and for the unsharp light beam.

Typically, the colour components will be colour densities.

The means for generating an unsharp light beam may be provided for example by a wide aperture similar to those illustrated in British Specification No. 712,499. Alternatively, this means may be provided by a diffuser which is periodically positioned between the image and the detection means by the sequencing means. In another example the means for generating an unsharp light beam may include means for reducing resolution by effectively stopping down an imaging lens.

Preferably, the means for generating the sharp and unsharp light beams includes focussing means for focussing the light beams onto the common detection means, the unsharp light beam generating means further comprising defocussing means which is positioned in the path of the unsharp light beam. Conveniently, the focussing means is common to both the sharp and unsharp light beam generating means.

Where common focussing means is provided the sequencing means may comprise a filter wheel positioned in the path of the light beam upstream or downstream of the focussing means. The filter wheel may comprise a set of circumferentially spaced filters corresponding to each colour component and at least one further filter having substantially the same transmittance properties as one of the other filters.

In some cases, the apparatus may further comprise a beam splitter for dividing the light beam downstream of the original image into two subsidiary beams for feeding to the sharp and unsharp light beam generating means respectively. In this case, the sequencing means may be provided by chopping means for causing the separate sharp and unsharp beams sequentially to impinge on the detection means. Such chopping means may be provided by movable mirrors or other movable optical components or the detection means itself may be movable to face the sharp and unsharp beams respectively. Preferably, the set of circumferentially spaced filters and the at least one further filter are radially offset such that in use the set of filters is aligned with the sharp beam and the further filter is aligned with the unsharp beam, the filters being arranged to prevent both the sharp and unsharp beams being transmitted through the filter wheel at the same instant.

In the case where a filter wheel is used, together with separate sharp and unsharp beams, it is particularly convenient if a further plate rotatable relatively to the filter wheel is included, the plate having a number of circumferentially spaced sections of different optical thickness which can be positioned in the path of the unsharp beam to impart the unsharp characteristic to the beam. With this arrangement, different degrees of defocussing can be achieved.

An example of apparatus in accordance with the invention will now be described with reference to the accompanying drawing, in which.

Figure 1A:
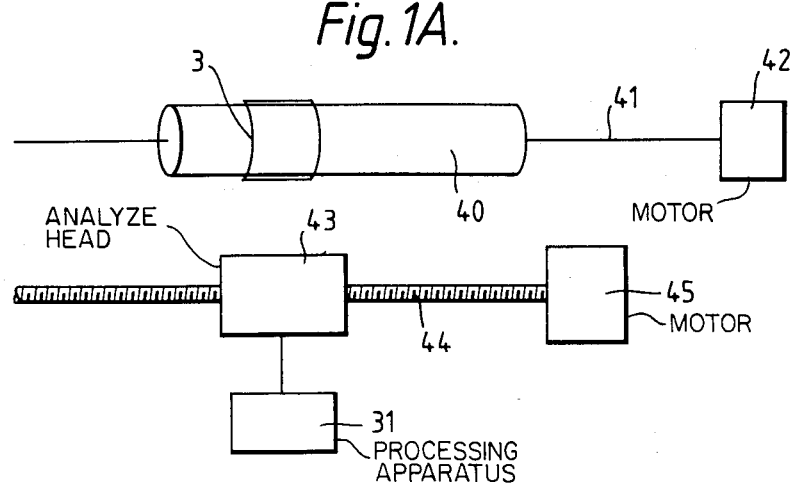
FIG. 1A is a schematic diagram of the apparatus.
Figure 1B:
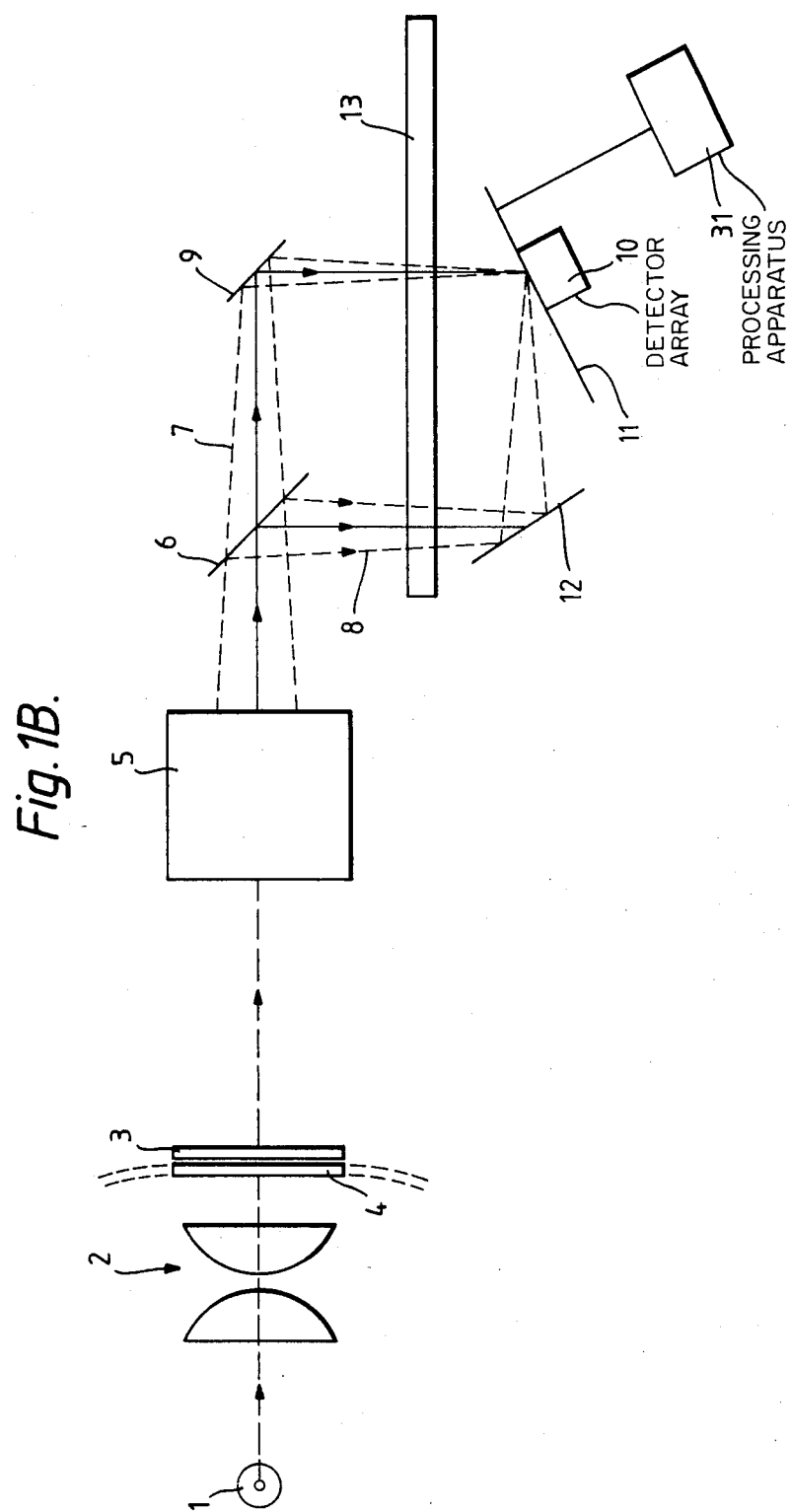
FIG. 1B is a schematic diagram illustrating the apparatus of FIG. 1A in more detail.

The apparatus shown in FIGS. 1A and 1B comprises a 100 watt quartz halogen lamp 1 which generates a light beam which passes through a conventional condenser lens system 2 and impinges on a transparency 3 supported by a transparent surface 4. If this apparatus is used in conventional scanning apparatus such as our Crosfield Magnascan 640 series then the supporting surface 4 will be formed by part of a rotating cylinder 40 (illustrated by dashed lines in FIG. 1A) which carries the transparency 3 through the light beam. After having passed through the transparency 3, the light beam is incident on a conventional imaging lens 5. The light source 1 and lens system 2 are positioned within the cylinder 40.

The cylinder 40 is mounted on an axle 41 which is rotated by a motor 42. An analyse head 43 is mounted on A lead screw 44 parallel with the cylinder 40 and rotated by a motor 45. In use, the axle 41 is rotated at a comparatively high speed while the lead screw 44 is rotated at a comparatively low speed so that the transparency is scanned.

Light from the lens 5 impinges on a beam splitter which, in this example, is constituted by a semi-silvered mirror 6. The light beam is thus divided into two subsidiary light beams 7, 8. The beam 7 impinges on a fully silvered mirror 9 which reflects the beam onto a single linear detector array of charge coupled devices 10 mounted on a printed circuit board 11 (and extending into the paper as seen in FIG. 1B). The light beam 8 impinges on a fully silvered mirror 12 which reflects the light beam onto the detector array 10. Each light beam 7, 8 passes through a special filter wheel 13 to be described below which is rotatable about a pivot positioned slightly above the plane of FIG. 1B.

Figure 2:
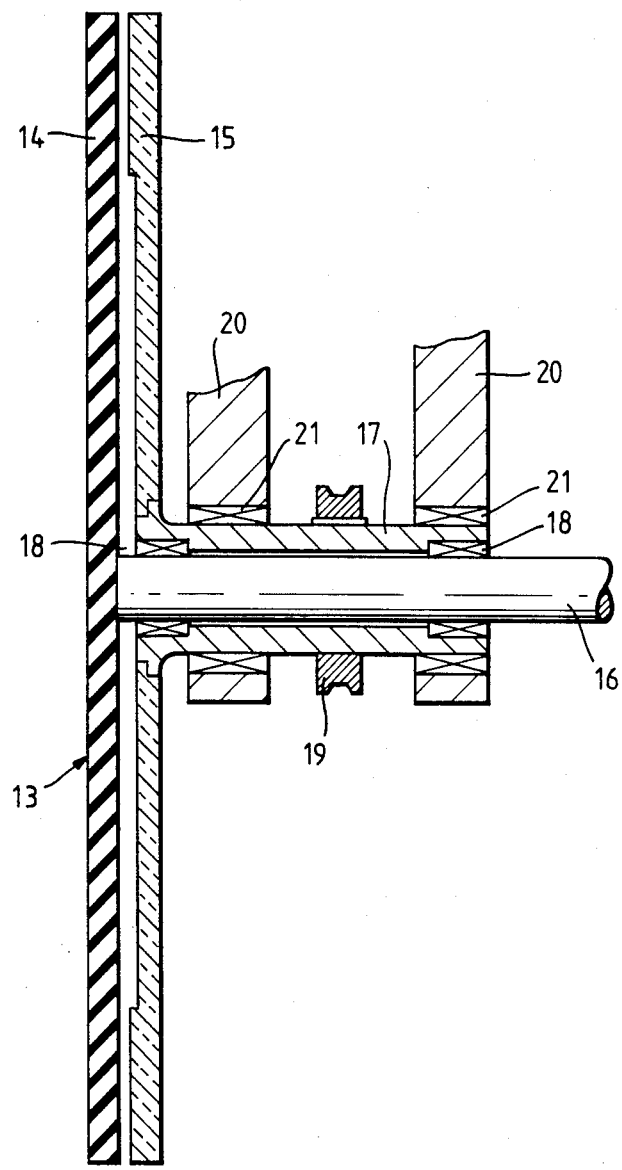
FIG. 2 illustrates the construction of the filter wheel shown in FIG. 1B in more detail; and, FIG. 3 is a plan of the filter wheel.

The filter wheel 13 is illustrated in more detail in FIG. 2 where it will be seen that it comprises two circular plates 14, 15 which are coaxially mounted. The plate 14 is fixed to a rotatably mounted rod 16 driven by a motor (not shown). The plate 15 is integrally formed with a bush 17 rotatably mounted by bearings 18 about the rod 16. A pulley 19 is non-rotatably fixed to the bush 17. The entire filter wheel assembly is mounted to a housing (not shown) via a pair of supports 20 and bearings 21. The pulley 19 is connected via a drive belt (not shown) to a stepping motor which is controlled by an operator to adjust the position of the plate 15.

Figure 3:
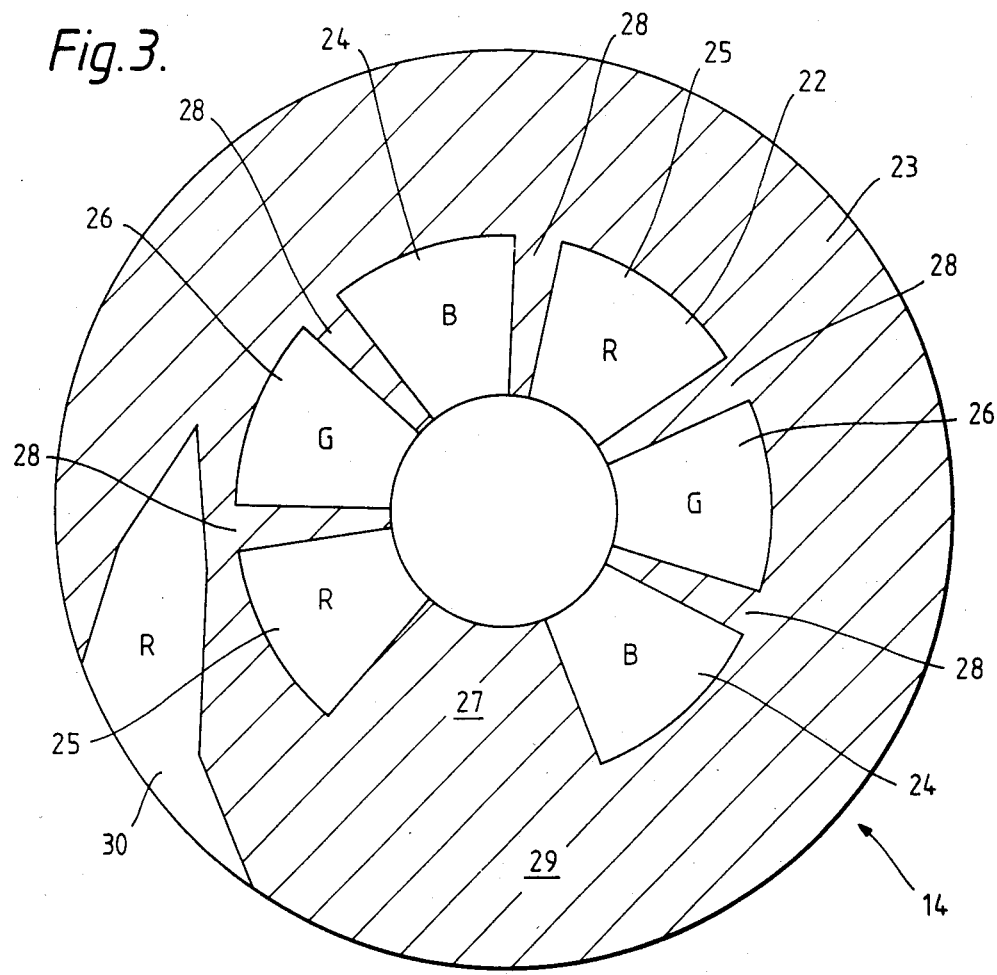

The plate 14 is illustrated in more detail in FIG. 3. The plate 14 comprises an inner ring 22 and an outer, concentric ring 23. The inner ring 22 comprises six filters: two blue 24, two red 25, and two green 26 and an opaque area 27. Each of the filters 24-26 are also spaced from each other by narrow opaque areas 28. The outer ring 23 is formed predominantly by an opaque area 29 but also includes a red filter 30.

A radially outer annular portion of the plate 15 in alignment with the section 23 of the plate 14 consists of four different circumferentially spaced thicknesses of glass. The radially inner, annular portion of the plate 15 comprises glass of a constant thickness, thinner than that of the outer portion.

When the apparatus is incorporated in scanning apparatus such as our Crosfield Magnascan 640 then items 5–13 will be incorporated in the analyse head 43.

The position of the filter wheel 13 relatively to the beams 7, 8 is adjusted so that the beam 8 passes through the outer section 23 of the plate 14 and the beam 7 passes through the inner section 22. Thus it will be seen that each beam 7, 8 passes through the plate 15 and then through a respective portion of the plate 14 before impinging on the linear array 10. The lens system 5 and the linear array 10 are positioned at a distance apart such that the beam 7 is focussed onto the linear array 10 for all orientations of the filter wheel 13. In contrast to this due to the thickness of glass in the radially outer portion of the plate 15 (which will be differnt to the thickness in the radially inner portion) the light beam 8 will not be focussed onto the linear array 10 when the mirror 12 is positioned symmetrically with the mirror 9. The form of the plate 14 as shown in FIG. 3 is arranged such that when the light beam 7 is incident on the filters 24-26 the light beam 8 is incident on the opaque portion 29. Conversely, when the light beam 8 is incident on the filter 30 then the light beam 7 will be incident on the opaque portion 27. In this way, only one of the beam 7, 8 is incident on the linear array 10 at any one time.

In use, the filter wheel 13 (i.e. the plate 14) is rotated via the rod 16 at relatively high speed (typically 1000 rpm) compared with the speed with which the light beam scans the transparency 3 so that for each element of the transparency 3 (defined by the speed of rotation of the plate 14) the linear array 10 receives the light beam 7 on six occasions in sequence followed by the light beam 8. The output of the linear array 10 comprises in sequence six sharp signals two for each colour followed by an unsharp signal. These signals will be discrete in nature due to the opaque areas 28 and can then be processed using either analogue or digital processing systems in a conventional manner. The processing apparatus such as a microcomputer and a store is indicated schematically by reference numeral 31. The shape of the filter 30 is chosen to give similarly timed on and off points to all the detectors in the linear array 10, and its width determines the time necessary for appropriately exposing the detectors.

Conveniently, the seven output signals for each element will be fed to a demultiplexer whose outputs will constitute, for example, sharp cyan, magenta, and yellow signals and an unsharp signal. These can then be processed in any known way such as described in No. GB-A-2032219.

Rotation of the plate 14 is caused by a continuous motor (not shown) whose speed can be controlled by the operator. The position of the plate 15 relatively to the beams 7, 8 can also be controlled by the operator using the stepping motor previously mentioned so that the amount of defocussing of the beam 8 can be controlled to be one of four different values corresponding to the four thicknesses of glass.

The form of the plate 14 can be chosen to suit particular circumstances and various modifications are possible. For example, only one filter of each of the three colours could be used and instead of a single unsharp signal, unsharp signals for each of the three colour components could be generated by providing additional filters and opaque areas in the outer and inner rings 23, 22 respectively.

It should be noted that the positioning of the linear array 10 at an angle to the incoming beams 7, 8 rather than normal to the beams provides a higher resolution.

We claim:

1. Scanning apparatus for generating signals representing color components of successively scanned picture elements of an original colored image, said apparatus comprising a light source adapted to generate a light beam; means for causing relative movement between said original image and a light beam generated by said light source whereby successive picture elements of said original image are scanned; means for generating a sharp light beam for each color component of each said element; means for generating an unsharp light beam for at least one color component of each said element; common detection means for receiving said sharp and unsharp light beams and for providing corresponding output signals; and sequencing means for causing said sharp and unsharp beams sequentially to impinge on said detection means.

2. Apparatus according to claim 1, wherein said means for generating said sharp and unsharp light beams includes focussing means for focussing said light beams onto said common detection means, said unsharp light beam generating means further comprising defocussing means which is positioned in the path of said unsharp light beam.

3. Apparatus according to claim 2, wherein said focussing means is common to both said sharp and unsharp light beam generating means.

4. Apparatus according to claim 3, wherein said sequencing means comprises a filter wheel positioned in the path of said light beam downstream of said focussing means.

5. Apparatus according to claim 4, wherein said filter wheel comprises a set of circumferentially spaced filters corresponding to each colour component and at least one further filter having substantially the same transmittance properties as one of said set of filters.

6. Apparatus according to claim 5, wherein said at least one further filter is radially offset from said set of circumferentially spaced filters.

7. Apparatus according to claim 4, further comprising a further plate rotatable relative to said filter wheel, said plate having a number of circumferentially spaced sections of different optical thickness which can be positioned in the path of said unsharp beam to impart the unsharp characteristic to said beam.

8. Apparatus according to claim 1, further comprising a beam splitter adapted to divide said light beam downstream of said original image into two subsidiary beams for feeding to said sharp and unsharp light beam generating means respectively.

9. Apparatus according to claim 8, wherein said means for generating said sharp and unsharp light beams includes focussing means for focussing said light beams onto said common detection means, said unsharp light beam generating means further comprising defocussing means which is positioned in the path of said unsharp light beam, said focussing means being common to both said sharp and unsharp light beam generating means and wherein said sequencing means comprises a filter wheel positioned in the path of said light beam downstream of said focussing means, said filter wheel comprising a set of circumferentially spaced filters corresponding to each colour component and at least one further filter having substantially the same transmittance properties as one of said set of filters, said apparatus further comprising a beam splitter adapted to divide said light beam downstream of said original image into two subsidiary beams for feeding to said sharp and unsharp light beam generating means respectively, wherein said set of circumferentially spaced filters and said at least one further filter are radially offset such that said set of filters is adapted to be aligned with said sharp beam and said further filter is adapted to be aligned with said unsharp beam, said filters being arranged to prevent both said sharp and unsharp beams being transmitted through said filter wheel at the same instant.

* * * * *